(12) United States Patent
Lee et al.

(10) Patent No.: US 6,350,292 B1
(45) Date of Patent: Feb. 26, 2002

(54) CYCLONE COLLECTOR FOR A VACUUM CLEANER HAVING A FLOW GUIDE

(75) Inventors: Sung Hwa Lee; Dong Jin Kwack; Hyeok Seong An; Kyoung Suk Lim; Jun Sang Park, all of Kyongsangnam-do; Byung Sun Yang, Seoul-tukpyoi-shi, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/448,300

(22) Filed: Nov. 24, 1999

(30) Foreign Application Priority Data

Nov. 24, 1998 (KR) .............................................. 98-50437
Sep. 8, 1999 (KR) .............................................. 99-38110

(51) Int. Cl.[7] .............................................. B01D 45/12
(52) U.S. Cl. ........................................ 55/459.1; 55/463
(58) Field of Search ................................ 55/457, 459.1, 55/463

(56) References Cited

U.S. PATENT DOCUMENTS

| | | | | |
|---|---|---|---|---|
| 1,360,349 A | * | 11/1920 | Wright | 55/457 |
| 1,923,498 A | * | 8/1933 | Wallinger | 55/457 |
| 2,811,219 A | * | 10/1957 | Wenzl | 55/459.1 |
| 4,311,494 A | * | 1/1982 | Conner et al. | 55/457 |
| 6,129,775 A | * | 10/2000 | Conrad et al. | 55/457 |

* cited by examiner

*Primary Examiner*—Robert A. Hopkins
(74) *Attorney, Agent, or Firm*—Fleshner & Kim, LLP

(57) ABSTRACT

A cyclone collector for vacuum cleaner including a cyclone body, a contaminated air suction inlet for sucking contaminants and air into the cyclone body, an air vent for exhausting air purified in the cyclone body, and a contaminant vent for exhausting the contaminants separated from the cyclone body, is characterized in that the cyclone body includes a flow guide therein, which is disposed opposite to the air vent so as to improve swirl force inside the cyclone body and prevent swirl flow and exhaust air flow from interfering with each other.

9 Claims, 5 Drawing Sheets

CYCLONE COLLECTOR FOR A VACUUM CLEANER HAVING A FLOW GUIDE

BACKGROUND OF THE INVENTION

1. Field of the Invention

The present invention relates to a cyclone collector, and more particularly, to a cyclone collector which is suitable for a vacuum cleaner.

2. Background of the Related Art

Generally, a cyclone collector is a device collecting contaminants such as dusts, naps, and paper scraps contained in the air, using a cyclone principle. A cyclone collector is being used in various fields, and mainly applied to a vacuum cleaner for home use.

Various types of cyclone collectors are proposed in such documents as U.S. Pat. Nos. 4,643,748, 4,353,008, 5,078, 761, 145,499 and so on.

There may be two types of cyclone collectors: a forward directional cyclone collector in which a direction that air containing contaminants ("contaminated air") is induced and a direction that purified air is exhausted are substantially same; and a reverse-directional cyclone collector in which the said directions are different.

A related art uni-directional cyclone collector will be described in detail.

The related art uni-directional cyclone collector includes collectors in which air suction is performed in axial direction of a cyclone body (FIGS. 1 and 2), and other collectors in which air suction is performed in tangent direction (FIGS. 3 and 4).

An embodiment of the related art uni-directional cyclone collector will be described referring to FIGS. 1 and 2.

A suction inlet 2 for sucking contaminated air in axial direction is formed at one side of a cylindrical cyclone body 1, and an air vent 4 for exhausting purified air in axial direction is formed at other side thereof. A means 3 for supplying is formed inside the cyclone body 1 to rotate the air sucked in axial direction in tangent direction. A contaminant vent 5 is formed at the air vent 4 to guide contaminants separated by a centrifugal force in a tangent direction, and a collecting bag 6 is detachably mounted at one side of the contaminant vent 5.

As shown in FIGS. 3 and 4, another embodiment of the related art uni-directional cyclone collector basically has a similar structure, except that there is no separate means for supplying rotative force since a suction inlet 12 is provided in tangent direction of a cyclone body 11. Reference numerals 13, 14 and 15 denote an air vent, a contaminant vent, and a collecting bag, respectively.

Meanwhile, in case of applying the aforementioned cyclone collector to a vacuum cleaner, the cyclone collector may be mounted either in a vacuum cleaner body, or between the body and the suction inlet body.

The operation of the related art cyclone collector will be described referring to FIGS. 1 and 2.

When a cyclone collector is in operation, a suction force generating means such as a suction fan (not shown) is put to work to produce suction force, and contaminant is sucked into the cyclone body 1 together with air through the suction inlet 2.

At this time, contaminated air sucked in axial direction is given rotative force in tangent direction passing through the means 3 for supplying rotative force, and the contaminated air rotates in the cyclone body 1 as a result. Accordingly, relatively light air concentrates to the center of the cyclone body 1 and makes a whirlwind, because the relatively light air receives less centrifugal force. This air is exhausted through the air vent 4 when air flow in a direction of the air vent (exhaust air) is formed at a certain moment.

On the other hand, contaminants heavier than air receive more centrifugal force and flow along an inner wall of the cyclone body 1, so as to move into the collecting bag 6 mounted at the contaminant vent 5.

When more than certain amount of contaminants are collected in the collecting bag 6, a user may separate the collecting bag from the contaminant vent 5 and remove the contaminants, then may join the collecting bag to the contaminant vent 5 to use it again.

The operation principle of another embodiment of the related art cyclone collector (FIGS. 3 and 4) is basically same with the aforementioned operation, except that contaminated air receives centrifugal force without any separate means for supplying rotative force, because the contaminated air is entered into the cyclone body in tangent direction.

A related art reverse-directional cyclone collector will be described referring to FIG. 5.

A suction inlet 32 is formed at an upper part of a cylindrical cyclone body 31 to suck contaminated air in tangent direction, and a contaminant vent 34 for guiding the contaminants separated by the centrifugal force in tangent direction is formed at a lower part of the cyclone body 31. A collecting bag 35 is detachably mounted at the contaminant vent 34.

Meanwhile, unlike the forward directional cyclone collector, in the reverse-directional cyclone director, an air vent 34 for exhausting purified air is formed at which the suction inlet 32 is formed, that is, at the upper part of the cyclone body 31 in axial direction.

The operation of the aforementioned reverse-directional cyclone collector will be described below.

Contaminated air which is sucked into the suction inlet 32 rotates along an inner wall of the cyclone body 31 and at the same time descends. In this process, contaminants are separated from the cyclone body 31 and collected in the collecting bag 35. Meanwhile, purified air is moved up by the suction force applied through the air vent 33, changing its direction from the lower part of the cyclone body 1 to the air vent 33, to be exhausted outside of the cyclone body 31.

That is, in the reverse-directional cyclone collector, a flow (swirl) rotating along an inner wall of the cyclone body 1 becomes an exhaust air flow which changes its direction at the lower part of the cyclone body (opposite to the air vent) and moves up.

However, the related art cyclone collector has several problems.

First, since the contaminated air which is sucked into the cyclone body doesn't receive sufficient centrifugal force, contaminants are not effectively collected, but are exhausted outside of the cyclone body together with the exhaust air, thereby reducing the collecting efficiency.

Second, swirl flow and exhaust air flow generated in the cyclone body interfere with each other and generates flow resistance, thereby increasing pressure loss and noise. This problem is particularly serious in the reverse-directional cyclone collector. The reason why is that flow rotating at the lower part of the cyclone body comes into collision against exhaust air flow when the flow is changed to the exhaust air flow, thereby generating a warm air which acts as an air resistance element.

SUMMARY OF THE INVENTION

Accordingly, the present invention is directed to a cyclone collector for vacuum cleaner that substantially obviates one or more of the problems due to limitations and disadvantages of the related art.

An object of the present invention is to provide a cyclone collector for vacuum cleaner, which improves collecting efficiency.

Other object of the present invention is to provide a cyclone collector for vacuum cleaner, which reduces flow resistance so as to reduce noise and pressure loss.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in a cyclone collector for vacuum cleaner according to the present invention including a cyclone body, a contaminated air suction inlet for sucking contaminants and air into the cyclone body, an air vent for exhausting air purified in the cyclone body, and a contaminant vent for exhausting the contaminants separated from the cyclone body, the cyclone collector is characterized in that the cyclone body includes a flow guide means therein, which is disposed opposite to the air vent so as to improve swirl force inside the cyclone body and prevent swirl flow and exhaust air flow from interfering with each other. The flow guide means has a larger diameter toward the air vent so as to prevent swirl flow and exhaust air flow from interfering with each other. The flow guide means also has a cylindrical guide member at one end thereof, which supports the flow interference prevention member and prevents the sucked air from flowing to a region on which suction force generated through the air vent acts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An embodiment of the present invention will be explained referring to the accompanying drawings.

Figure 7:
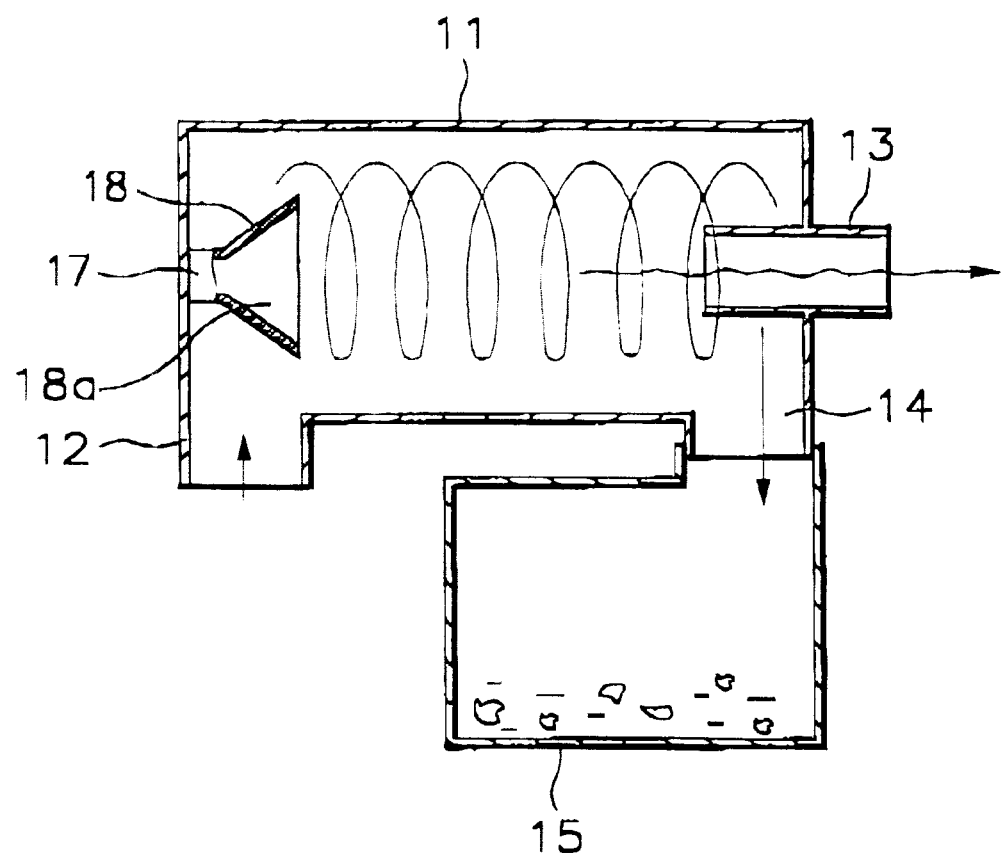
FIG. 7 is a longitudinal sectional view showing a cyclone collector in accordance with the second embodiment of the present invention.

FIG. 7 is a longitudinal sectional view showing a cyclone collector in accordance with the first embodiment of the present invention. The first embodiment of a cyclone collector in accordance with the present invention will be described referring to FIG. 7.

Same elements as the related art cyclone collector are given same names and reference numerals, and explanations for those elements will be omitted.

The cyclone collector according to the first embodiment of the present invention basically includes a cyclone body 1, a contaminated air suction inlet 2, an air vent 4, a collecting bag 6, and a means 3 for supplying rotative force in the same manner as the related art cyclone collector.

However, in the cyclone collector of the present invention, a flow guide means is provided at a certain place inside the cyclone body. The flow guide means acts to improve a centrifugal force of air which is sucked into the cyclone body 1, and to reduce a flow resistance. At this time, the flow guide means is preferably located opposite to the air vent 4. In more detail, the flow guiding means is provided at an outlet of the rotative force supplying means 3.

The flow guide means includes a guiding member 7 and a flow interference prevention member 8 connected with the guide member 7, for guiding air to the inner wall of the cyclone body 1 and for reducing the flow resistance.

Preferably, the guide member 7 has a cylindrical shape.

The flow interference prevention member 8 increases in its shape from an air-suction part to an air-exhaust part, and the larger end is preferably subsided to form a depression 8a. This is because the flow interference prevention member 8 formed as above may guide air more efficiently to the inner wall of the cyclone body as the air moves from the air-suction part to the air-exhaust part. This is also because that the flow interference prevention member 8 may effectively prevent swirl and exhaust air to flow from interfering with each other.

Any shape in which a size becomes larger from the air-suction part to the air-exhaust part can be applied for the flow interference prevention member 8. For example, a funnel shape, a trumpet shape, a semi-spherical shape, or a skirt shape may be applied for the-flow interference prevention member 8.

Figure 1:
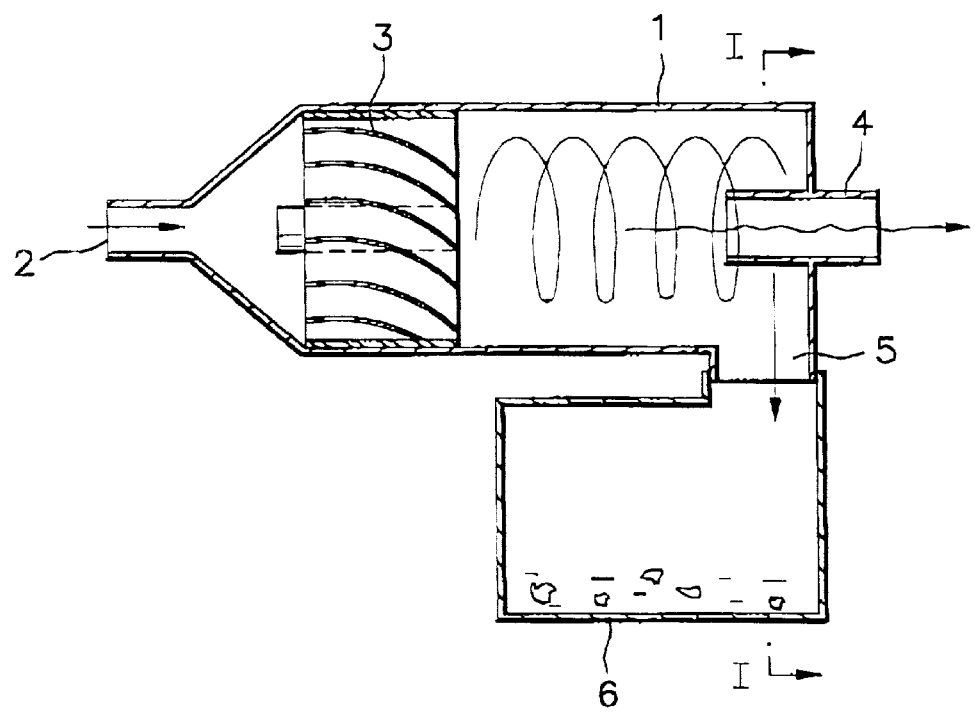
FIG. 1 is a longitudinal sectional view showing an embodiment of a related art cyclone collector.
Figure 2:
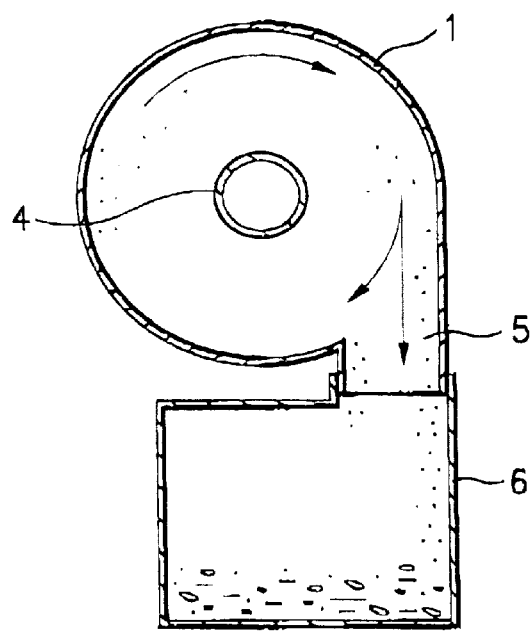
FIG. 2 is a sectional view of line I—I of FIG. 1.
Figure 3:
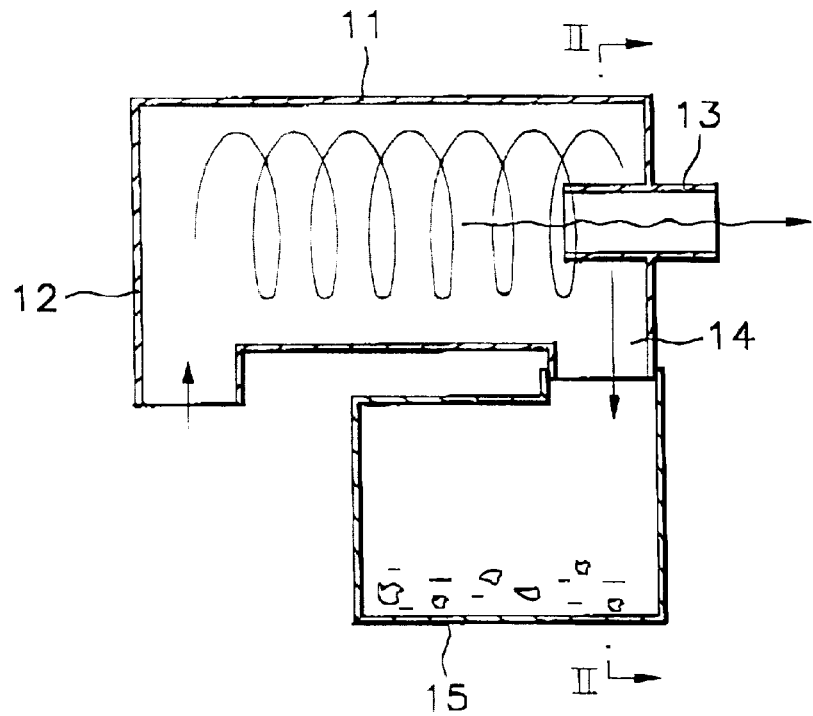
FIG. 3 is a longitudinal sectional view showing another embodiment of the related art cyclone collector.
Figure 4:
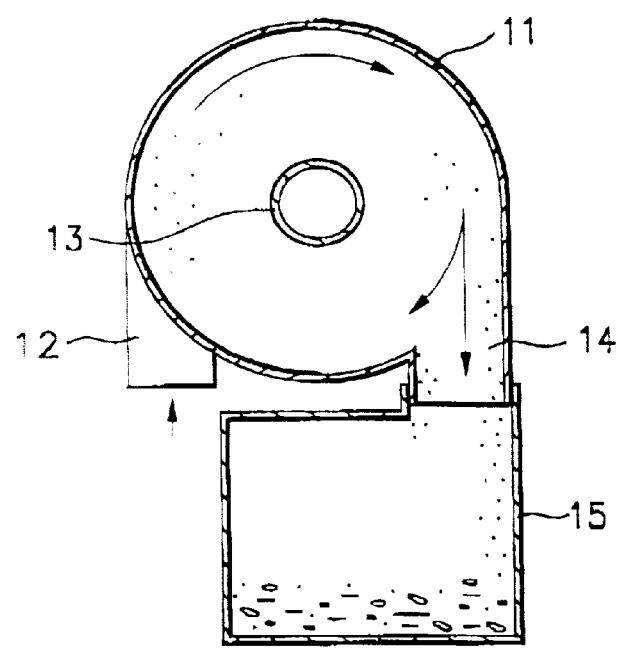
FIG. 4 is a sectional view of line II—II line of FIG. 3.
Figure 5:
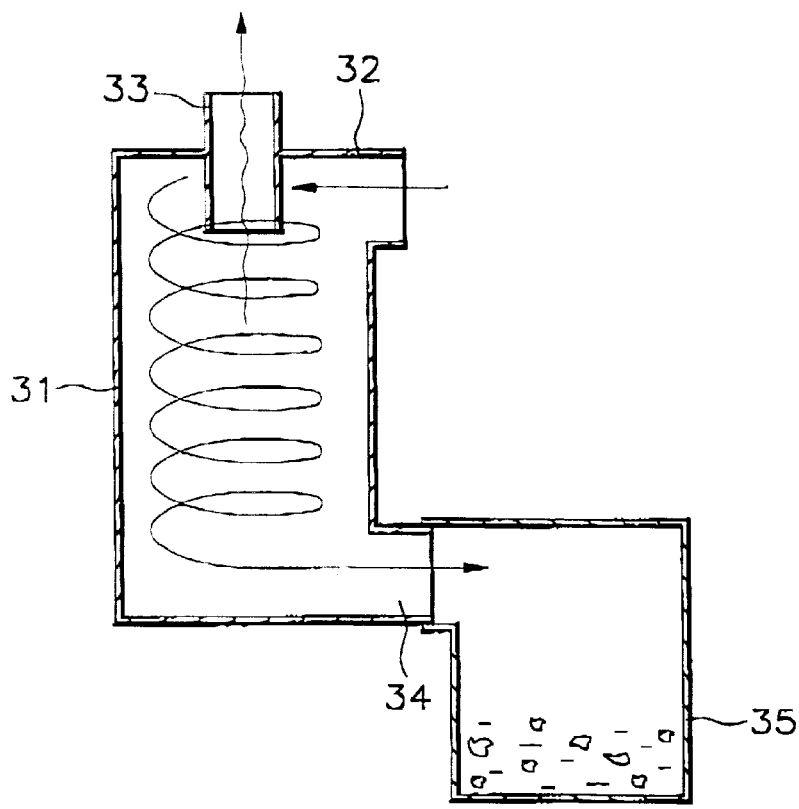
FIG. 5 is a longitudinal sectional view showing a related art reverse-directional cyclone collector.
Figure 6:
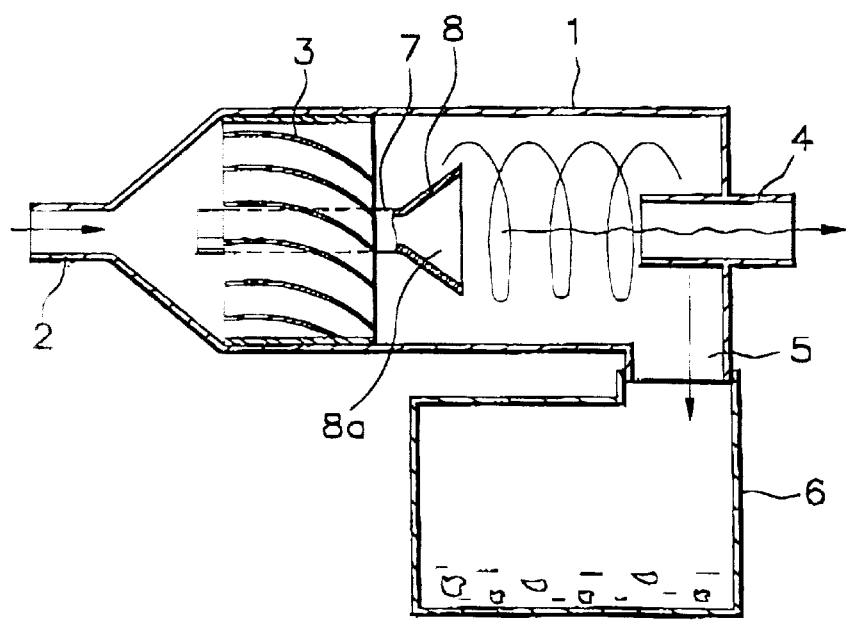
FIG. 6 is a longitudinal sectional view showing a cyclone collector in accordance with the first embodiment of the present invention.

A uni-directional cyclone collector in accordance with the first embodiment of the present invention will be described referring to FIG. 6.

If the cyclone collector is set into operation, contaminated air is sucked into the cyclone body 1 through the suction inlet 2 of the cyclone body 1. The sucked contaminated air is given a rotative force in tangent direction, passing through the rotative force supplying means 3.

The air to be exhausted, which is given a rotative force from the rotative force supplying means 3 is guided to an inner wall of the cyclone body 1. At this time, the contaminated air is spread to the inner wall of the cyclone body, more efficiently with the flow interference prevention member 8 of which the diameter becomes larger from the air-suction part to the air-exhaust part. That is, the contaminated air which is sucked into the cyclone body 1 is forcibly spreading to the inner wall of the cyclone body 1 by the flow guide means.

The air and contaminants efficiently guided to the inner wall of the cyclone body 1 by the flow guide means 8 receive different centrifugal forces because of weight difference.

Accordingly, the air which is relatively light concentrates to the center of the cyclone body 1 and generates a whirlwind, then is formed as an exhaust air flow at a certain moment and exhausted through the air vent 4. On the other hand, relatively heavier contaminants continually move along the inner wall of the cyclone body 1 and are then exhausted in tangent direction through the contaminant vent 5, to be finally collected to the collecting bag 6.

In this process, an initial air flow (swirl) which is given a rotative force by the rotative force supplying means 3 is guided to the inner wall of the cyclone body 1 by the flow guide means. Accordingly, contaminants can efficiently be prevented from being directly exhausted to the air vent 4 together with the exhaust air without flowing to the inner wall of the cyclone body 1 by air exhaust pressure generated along the air vent 4.

A cyclone collector in accordance with the second embodiment of the present invention will be described referring to FIG. 7.

A basic structure of the second embodiment is similar to that of the first embodiment, that is, the second embodiment also includes a cyclone body 11, a contaminated air suction inlet 12, an air vent 13, and a collecting bag 15. However, the air suction inlet 12 is formed in tangent direction of the cyclone body 11, and thus a means for supplying rotative force is not formed.

A flow guide means is formed opposite to the air vent 14 also in the second embodiment, and the flow guide means includes a guide member 17 and a flow interference prevention member 18.

The operation principle of the second embodiment is same with that of the aforementioned first embodiment, and its description will be omitted.

Figure 8:
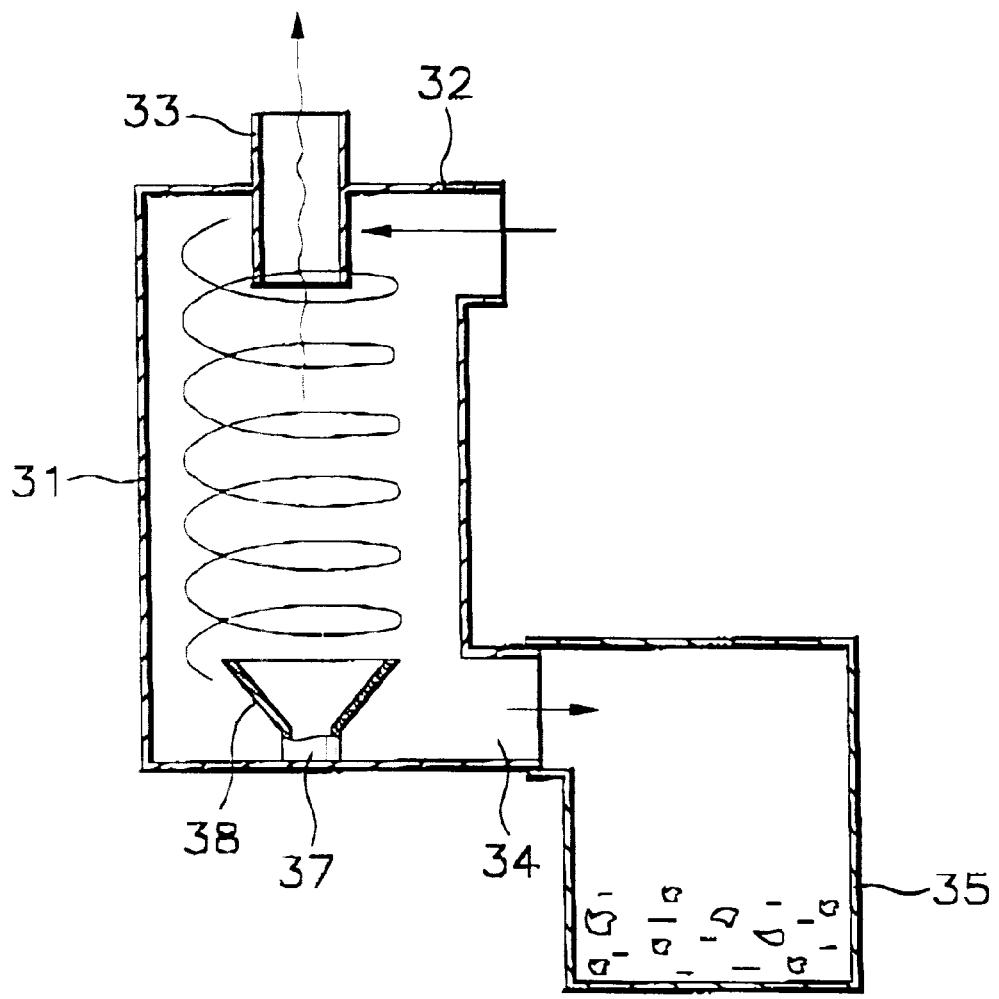
FIG. 8 is a longitudinal sectional view showing a cyclone collector in accordance with the third embodiment of the present invention.

A cyclone collector in accordance with the third embodiment of the present invention will be described referring to FIG. 8.

In the third embodiment, a flow guide means which is a main feature of the present invention is applied to a reverse-directional cyclone collector. In the fourth embodiment, in the same manner as the aforementioned embodiments, a flow guide means includes a guide member 37 and a flow interference prevention member 38. The flow guide means is also provided opposite to the air vent 33, that is, at a lower part of the cyclone body 31. Of course, a larger end of the flow interference prevention member 38 is oriented to the air vent 33 and is depressed. In the fourth embodiment, the guide member 37 acts to guide contaminants separated by the centrifugal force to be efficiently exhausted to the collecting bag 35, rather than guide the suction air.

With the above structure, collision and interference may be efficiently decreased by the flow guide means in the process of changing swirl sucked by the contaminated air suction inlet 32 and rotating at the lower part of the cyclone body 31 to exhaust air flow, thereby reducing the flow resistance. Accordingly, pressure loss and noise may also be reduced.

In more detail, swirl rotating toward the lower part of the cyclone body 31 is given the air exhaust pressure through the air vent and changed to the exhaust air flow. At this time, the flow may naturally be changed along the depression inside the flow guide means, thereby avoiding interference and collision between the air flows, Furthermore, the flow guide means separates the contaminants flowing at the inlet of the contaminant vent inside the cyclone body 31 from the air which is changed from swirl flow to the exhaust air flow, so that the contaminants can be prevented from entering into the exhaust air by interference.

Meanwhile, the cyclone collector in accordance with the present invention may be mounted in either a main body of a vacuum cleaner, or between the main body and a suction inlet body of a vacuum cleaner, as described in the related art.

As aforementioned, the cyclone collector according to the present invention has the following advantages.

Since the contaminated air which is sucked into the cyclone body through the suction inlet is efficiently guided to the inner wall of the cyclone body in an initial step, the air receives sufficient centrifugal force. Accordingly, the contaminants separated from the air move furthest to the center of the cyclone body, on which an air-exhaust pressure (vacuum pressure) acts, thereby efficiently preventing the contaminants from being externally exhausted together with the exhaust air.

Moreover, when swirl flow and exhaust air flow are formed within the cyclone body, a region of swirl flow and a region of exhaust air flow become distinctive by means of the flow guide means, thereby preventing mutual interference. Accordingly, pressure loss and noise can be reduced.

It will be apparent to those skilled in the art that various modifications and variations can be made in the cyclone collector for vacuum cleaner according to the present invention without departing from the spirit or scope of the invention. Thus, it is intended that the present invention covers the modifications and variations of the invention provided they come within the scope of the appended claims and their equivalents.

What is claimed is:

1. A cyclone collector, comprising:

a cyclone body;

a contaminated air inlet for admitting contaminated air into the cyclone body, wherein the contaminated air inlet has a central axis that is tangent to the cyclone body such that contaminated air entering the cyclone body tends to swirl around an interior of the cyclone body;

an air vent for exhausting purified air from the cyclone body;

a contaminant vent for exhausting contaminants from the cyclone body; and a flow guide mounted in the cyclone body opposite to the air vent, wherein the flow guide includes:

a cylindrical guide member attached to the cyclone body, and a flow interference prevention member attached to the cylindrical guide member, wherein the flow interference prevention member has a diameter that increases from a first end connected to the cylindrical guide member to a second end opposite to the cylindrical guide member.

2. The cyclone collector of claim 1, wherein the second end of the flow interference prevention member has a hollow, conical interior surface.

3. The cyclone collector of claim 1, wherein the flow guide is separated from the air vent such that no portion of the air vent overlaps the flow guide.

4. A cyclone collector, comprising:
a cyclone body;
a contaminated air inlet for admitting contaminated air into the cyclone body;
an air vent for exhausting purified air from the cyclone body;
a contaminant vent for exhausting contaminants from the cyclone body; and
a flow guide mounted in the cyclone body opposite to the air vent, wherein the flow guide is attached to the cyclone body adjacent the contaminated air inlet, and wherein the flow guide includes:
  a cylindrical guide member attached to the cyclone body, and
  a flow interference prevention member attached to the cylindrical guide member, wherein the flow interference prevention member has a diameter that increases from a first end connected to the cylindrical guide member to a second end opposite to the cylindrical guide member.

5. A reverse direction cyclone collector, comprising:
a cyclone body;
a contaminated air inlet located at a first end of the cyclone body for admitting contaminated air into the cyclone body;
an air vent located at the first end of the cyclone body for exhausting purified air from the cyclone body;
a contaminant vent located at a second end of the cyclone body opposite the first end, wherein the contaminant vent is configured to exhaust contaminants from the cyclone body; and
a flow guide mounted at the second end of the cyclone body, wherein the flow guide includes:
  a cylindrical guide member attached to the second end of the cyclone body, and
  a flow interference prevention member attached to the cylindrical guide member, wherein the flow interference prevention member has a diameter that increases from a first end connected to the cylindrical guide member to a second end opposite to the cylindrical guide member.

6. The reverse direction cyclone collector of claim 5, wherein the cyclone body is cylindrical, and wherein the contaminated air inlet has a central axis tangent to the cyclone body such that contaminated air entering the cyclone body tends to swirl around an interior of the cyclone body.

7. The reverse direction cyclone collector of claim 5, wherein the second end of the flow interference prevention member has a hollow, conical interior surface.

8. The reverse direction cyclone collector of claim 5, wherein the air vent includes a substantially cylindrical air passage that extends into the cyclone body.

9. The reverse direction cyclone collector of claim 8, wherein the flow interference prevention member and the cylindrical air passage are separated such that the flow interference prevention member does not overlap with the cylindrical air passage.

* * * * *